(12) United States Patent
Suetani et al.

(10) Patent No.: US 9,640,963 B2
(45) Date of Patent: *May 2, 2017

(54) TERMINAL-PROVIDED WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi (JP)

(72) Inventors: Masaharu Suetani, Yokkaichi (JP); Tetsuya Nakamura, Yokkaichi (JP); Katsufumi Matsui, Yokkaichi (JP); Kazuo Nakashima, Yokkaichi (JP); Kouji Fukumoto, Yokkaichi (JP); Daisuke Hashimoto, Yokkaichi (JP); Toshiya Hirooka, Yokkaichi (JP); Kentaro Tachi, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/383,204

(22) PCT Filed: Jan. 31, 2013

(86) PCT No.: PCT/JP2013/052167
§ 371 (c)(1),
(2) Date: Sep. 5, 2014

(87) PCT Pub. No.: WO2013/132929
PCT Pub. Date: Sep. 12, 2013

(65) Prior Publication Data
US 2015/0047900 A1 Feb. 19, 2015

(30) Foreign Application Priority Data
Mar. 8, 2012 (JP) ................. 2012-051207

(51) Int. Cl.
H02G 15/02 (2006.01)
H02G 15/08 (2006.01)
(Continued)

(52) U.S. Cl.
CPC ............ *H02G 15/046* (2013.01); *H01R 4/70* (2013.01)

(58) Field of Classification Search
CPC .......... H01R 4/20; H01R 11/12; H01R 4/183; H01R 13/5216; H01R 11/28;
(Continued)

(56) References Cited

U.S. PATENT DOCUMENTS 3,945,701 A * 3/1976 Boeke ................. H01R 13/523
439/281
5,072,605 A * 12/1991 Imazu .................... B21D 51/26
72/347
(Continued)

FOREIGN PATENT DOCUMENTS

DE 231770 A1 10/1974
DE 102009027447 A1 1/2011
(Continued)

OTHER PUBLICATIONS

German Office Action Dated Oct. 18, 2016.

*Primary Examiner* — Timothy Thompson
*Assistant Examiner* — Guillermo Egoavil
(74) *Attorney, Agent, or Firm* — Gerald E. Hespos; Michael J. Porco; Matthew T. Hespos

(57) ABSTRACT

A terminal-provided wire (1) includes an insulated wire (10) with an insulation coating (12) made of polyolefin-based resin, an adhesive layer (30) formed on a surface of the insulation coating (12) over the entire circumference and a waterproof resin portion (40) formed by insert molding. The waterproof resin portion (40) covers an area from a part of (Continued)

the insulated wire (10) where the adhesive layer (30) is formed to a connected part (21) of a metal terminal (20) to a core (11). The adhesive layer 30) is made of modified olefin-based resin, which is olefin-based resin modified with a polar group. The waterproof resin portion (40) is made of aromatic nylon.

20 Claims, 3 Drawing Sheets

(51) Int. Cl.
    *H02G 15/04*     (2006.01)
    *H01R 4/70*     (2006.01)

(58) Field of Classification Search
    CPC ...... H01R 2201/26; H01R 4/023; H01R 4/18; H01R 4/62; H01R 4/70; H01R 4/72; H01R 4/185; H01R 13/52; H01R 13/523; H01R 13/562; H01R 43/05; H01R 43/005; B21D 51/26; B29C 45/14639; B29C 45/14467; B29L 2031/3462; B32B 27/32; B32B 27/322; B32B 27/304; B32B 27/308; B32B 27/302; C08F 210/06; C08F 255/02; C08L 2207/12; C09J 7/0207; C09J 123/14; C09J 123/20; C09J 151/06; C09J 2201/36; H01B 3/441; H01B 3/447; H01B 3/308; H01B 7/2825; H01B 13/08; H02G 15/046; H02G 15/013; Y10S 439/932; Y10T 29/49192; Y10T 428/23986; Y10T 428/31645; Y10T 428/31855
    USPC ............. 175/75 R, 77 R, 137 A; 76/46; 174/77 R, 75 R; 156/53; 428/352, 354; 439/274, 281, 320; 525/242, 297, 298, 525/293, 288, 279
    See application file for complete search history.

(56) References Cited

U.S. PATENT DOCUMENTS

| | | | | |
|---|---|---|---|---|
| 5,346,773 A | * | 9/1994 | Simoens | C08L 77/00 428/458 |
| 5,912,433 A | * | 6/1999 | Pulido et al. | 174/77 R |
| 6,064,002 A | * | 5/2000 | Hayami et al. | 174/564 |
| 6,306,954 B1 | * | 10/2001 | Nishikawa et al. | 524/514 |
| 6,398,563 B1 | | 6/2002 | Kanagawa et al. | |
| 8,802,782 B2 | | 8/2014 | Becker | |
| 2005/0005989 A1 | * | 1/2005 | Roloff | B32B 1/08 138/137 |
| 2005/0009394 A1 | * | 1/2005 | Kameyama | H01R 13/5216 439/274 |
| 2005/0197447 A1 | * | 9/2005 | Gu | C08F 8/00 524/505 |
| 2007/0003775 A1 | * | 1/2007 | Ushino | B32B 9/04 428/500 |
| 2007/0071923 A1 | * | 3/2007 | Suzuki | G03G 5/0507 428/35.7 |
| 2007/0248827 A1 | * | 10/2007 | Rukavina | B32B 17/1077 428/412 |
| 2009/0082525 A1 | * | 3/2009 | Nakamura | C08J 5/12 525/122 |
| 2009/0169860 A1 | * | 7/2009 | Katsunori | C08J 9/10 428/314.8 |
| 2009/0283297 A1 | * | 11/2009 | Yasuda | H01B 3/30 174/110 SR |
| 2010/0206631 A1 | * | 8/2010 | Peters | H01R 4/62 174/77 R |
| 2010/0273012 A1 | * | 10/2010 | Moriguchi | C08L 23/0815 428/437 |
| 2011/0003095 A1 | * | 1/2011 | Becker | C09J 151/06 428/17 |
| 2011/0003928 A1 | * | 1/2011 | Shimizu | C08F 297/046 524/502 |
| 2011/0033699 A1 | * | 2/2011 | Hayashi | B32B 7/12 428/352 |
| 2011/0048762 A1 | * | 3/2011 | Sawamura | 174/78 |
| 2011/0192632 A1 | * | 8/2011 | Abe | H01B 3/301 174/120 SR |
| 2014/0088261 A1 | * | 3/2014 | Crowther | C08F 110/06 525/333.7 |

FOREIGN PATENT DOCUMENTS

| | | | | |
|---|---|---|---|---|
| JP | | 07-106041 | 4/1995 | |
| JP | | 2002-184513 | 6/2002 | |
| JP | | 2003234144 A | * 8/2003 | |
| JP | | 2006-123458 | 5/2006 | |
| WO | WO 2012070691 A1 | * 5/2012 | ............ H01R 4/185 |

* cited by examiner

|  | EC1 | EC2 (150°C) | EC3 (−40°C) | EC4 (−40~100°C) |
|---|---|---|---|---|
| S0 | OK | OK | OK | OK |
| S1 | NG | OK | NG | NG |
| S2 | NG | OK | NG | NG |

TERMINAL-PROVIDED WIRE

BACKGROUND

1. Field of the Invention

The present invention relates to a terminal-provided wire including an insulated wire and a metal terminal provided on an end part of the insulated wire.

2. Description of the Related Art

In recent years, a terminal-provided wire including an insulated wire and a metal terminal provided on an end part of the insulated wire has been required to have higher waterproof performance in a wiring harness mounted in an automotive vehicle. The terminal-provided wire having a waterproof function includes a waterproof resin portion covering a waterproof area of an end part. A terminal-provided wire provided with a waterproof resin portion is referred to as a waterproof terminal-provided wire below.

The waterproof resin portion is a part made of synthetic resin and configured to cover a protection area. The waterproof resin portion is formed by insert molding with the protection area including an area from an insulation coating part at the end part of the insulated wire to a connected part of the metal terminal to a core as an insert part.

Further, in a manufacturing process of the waterproof terminal-provided wire, an adhesive is applied to a surface of the insulation coating at the end part of the insulated wire over the entire circumference before the insert molding of the waterproof resin portion. This adhesive becomes an adhesive layer for bonding the insulation coating and the waterproof resin portion to close a clearance between the insulation coating and the waterproof resin portion. This adhesive layer also functions as a water sealing portion for preventing the intrusion of water.

In the waterproof terminal-provided wire, a thermal expansion coefficient of the insulation coating and that of the waterproof resin portion differ. Thus, the adhesive layer needs to have stretchability to be able to cope with a difference in thermal expansion coefficient between the insulation coating and the waterproof resin portion. Generally, silicon-based resin or rubber-based resin having water resistance and stretchability is used as the material of the adhesive that functions as a water sealant.

However, if an adhesive layer of silicon-based resin or rubber-based resin is adopted when an insulated wire includes an insulation coating made of olefin-based resin, adhesiveness (water sealability) between an insulation coating and a waterproof resin portion is insufficient. Thus, water is likely to intrude into a connected part between a core and a metal terminal. This water intrusion causes corrosion and a contact failure in the connected part between the core and the metal terminal.

On the other hand, it is disclosed in Japanese Unexamined Patent Publication No. 2006-123458 to increase adhesiveness between an insulation coating made of olefin-based resin and an adhesive by applying a corona discharge processing or plasma discharge processing to an insulation coating of an insulated wire in the manufacturing process of a waterproof terminal-provided wire.

However, the known approach leads to an increase in the number of manufacturing steps and necessitates the introduction of a costly facility to perform the corona discharge processing or plastic discharge processing in the manufacturing process of the waterproof terminal-provided wire.

The present invention aims to increase water sealability between an insulation coating made of olefin-based resin and a waterproof resin portion without requiring an increase in the number of manufacturing steps and facility in a terminal-provided wire including a waterproof resin portion for covering a connected part of an insulated wire and a metal terminal.

SUMMARY OF THE INVENTION

A terminal-provided wire according to the present invention comprises first through fourth constituent elements. The first constituent element is an insulated wire including an electrically conductive core and an insulation coating made of polyolefin-based resin for covering the core. The second constituent element is a metal terminal electrically connected to the core at an end part of the insulated wire. The third constituent element is an adhesive layer made of modified olefin-based resin, which is olefin-based resin modified with a polar group, and formed on a surface of the insulation coating at the end part of the insulated wire over the entire circumference. The fourth constituent element is a waterproof resin portion made of aromatic nylon and formed to cover a protection area. This waterproof resin portion is formed by insert molding with the protection area as an insert part. The protection area includes at least an area from a part of the insulated wire where the adhesive layer is formed to a connected part of the metal terminal to the core.

In the terminal-provided wire according to the present invention, the adhesive layer is preferably made of a material which is stretched by 104.7% or more under an environment of −40° C. in a test in accordance with the provision of JIS (Japanese Industrial Standards) K6251.

In the terminal-provided wire according to the present invention, adhesion strength between the insulation coating and the adhesive layer is preferably 183 kPa or more under an environment of 150° C. in a test in accordance with the provision of JIS K6850.

According to the present invention, the following effect is achieved in a terminal-provided wire including a waterproof resin portion for covering a connected part of an insulated wire and a metal terminal. Specifically, it is possible increase water sealability between an insulation coating made of olefin-based resin and the waterproof resin portion without requiring an increase in the number of manufacturing steps and facility.

DETAILED DESCRIPTION

An embodiment of the present invention is described with reference to the accompanying drawings. The following embodiment is one specific example of the present invention and not intended to limit the technical scope of the present invention.

Figure 1:
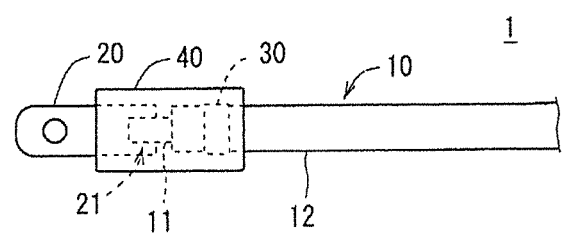
FIGS. 1(*a*) and 1(*b*) respectively are a top plan view and a side elevational view of a terminal-provided wire according to an embodiment of the present invention.
Figure 1:
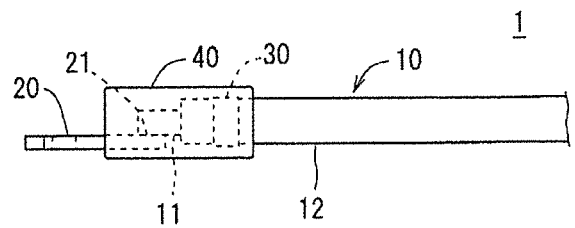

First, with reference to FIG. 1, the configuration of a terminal-provided wire 1 according to the embodiment of the present invention is described. As shown in FIG. 1, the terminal-provided wire 1 includes an insulated wire 10, a metal terminal 20, an adhesive layer 30 and a waterproof resin portion 40.

The insulated wire 10 includes an electrically conductive core 11 and an insulation coating 12 made of polyolefin-based resin for covering the core 11. The insulated wire 10 is so formed that an end part of the core 11 extends from an end part of the insulation coating 12.

The core 11 is, for example, made of a metal material such as copper, copper alloy or aluminum alloy. On the other hand, the insulation coating 12 is, for example, made of polyolefin-based resin such as cross-linked polyethylene or cross-linked polypropylene.

The metal terminal 20 is a terminal electrically connected to the core 11 at the end part of the insulated wire 10. The metal terminal 20 is a fitting made of a metal material such as copper or copper alloy. The metal terminal 20 is a part to be connected to a connection partner such as a terminal portion of an electric device or a terminal of another terminal-provided wire. In an example shown in FIG. 1, the metal terminal 20 is a terminal in the form of a flat plate formed with a through hole through which a screw is inserted. However, the metal terminal 20 may also be in the form of a plate formed with no through hole or have another shape such as a bar shape.

For example, the metal terminal 20 is fixed to the core 11 at the end part of the insulated wire 10 such as by ultrasonic welding. Alternatively, the metal terminal 20 is fixed by being crimped to the end part of the insulated wire 10 if it is a crimping terminal formed with crimping portions to be respectively crimped to parts of the core 11 and the insulated wire 12 of the insulated wire 10.

The adhesive layer 30 is a layer of an adhesive formed on a surface of the insulation coating 12 at the end part of the insulated wire 10 over the entire circumference. The adhesive layer 30 bonds the outer surface of the insulation coating 12 and the inner surface of the waterproof resin portion 40 and closes a clearance between these surfaces.

The waterproof resin portion 40 is a resin member for covering a predetermined protection area. The waterproof resin portion 40 is formed by insert molding with the predetermined protection area on the end part of the terminal-provided wire 1 as an insert part. The protection area is an area including at least an area from a part of the insulated wire 10 where the adhesive layer 30 is formed to a connected part 21 of the metal terminal 21 to the core 11.

A characteristic of the terminal-provided wire 1 is a combination of materials of the adhesive layer 30 and the waterproof resin portion 40 for the insulation coating 12 made of polyolefin-based resin. Specifically, in the terminal-provided wire 1, the adhesive layer 30 is a layer of an adhesive made of modified olefin-based resin, which is olefin-based resin modified with a polar group. Further, the waterproof resin portion 40 is a resin member made of aromatic nylon.

The olefin-based resin as the material of the adhesive layer 30 is, for example, styrene-butadiene-styrene block copolymer (SBS) or styrene-ethylene/butylene-styrene block copolymer (SEBS), which is styrene-based thermoplastic elastomer. Further, the polar group used to modify the olefin-based resin is anhydrous maleic acid.

Figure 2:
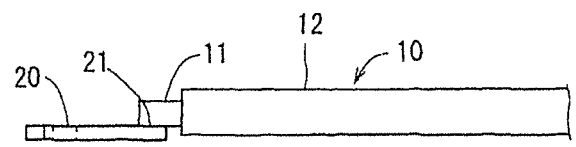
FIGS. 2(*a*), 2(*b*) and 2(*c*) are side elevational views showing three steps in the procedure of manufacturing the terminal-provided wire.
Figure 2:
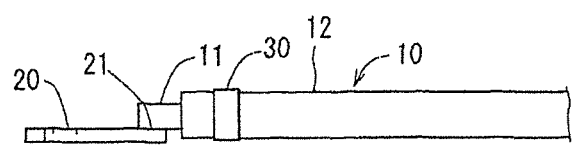
Figure 2:
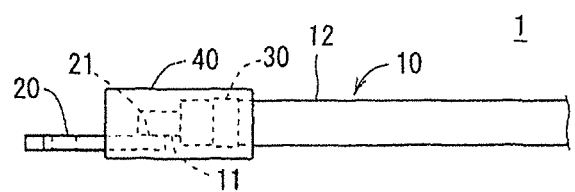

The procedure of manufacturing the terminal-provided wire 1 is outlined with reference to FIG. 2. Note that FIG. 2 are diagrams showing the procedure of manufacturing the terminal-provided wire 1.

In the manufacturing process of the terminal-provided wire 1, the metal terminal 20 is first mounted on the end part of the insulated wire 10 by welding or crimping. In this way, the core 11 of the insulated wire 10 and the metal terminal 20 are integrally coupled and electrically connected as shown in FIG. 2(a).

Subsequently, the adhesive layer 30 is formed on the surface of the insulation coating 12 at the end part of the insulated wire 10. More specifically, the adhesive made of modified olefin-based resin is applied to the surface of the insulation coating 12 at the end part of the insulated wire 10 over the entire circumference. The adhesive as the material of the adhesive layer 30 is a so-called hot-melt type adhesive made of thermoplastic synthetic resin. Thus, the heated and melted adhesive is applied to the surface of the insulation coating 12.

Further, to prevent the adhesive from being cured while being applied, the adhesive is preferably applied to the surface of the insulation coating 12 in a state diluted with a volatile solvent such as toluene. The applied adhesive is cooled and cured after adhering to the insulation coating 12, and the solvent is vaporized. In this way, the adhesive layer 30 adhering to the insulation coating 12 is formed as shown in FIG. 12(b).

A step of applying the adhesive is, for example, performed as follows. First, the end part of the insulation coating 12 is brought closer to an adhesive discharge port of a dispenser filled with the adhesive. Further, the insulated wire 10 is rotated by 360° or more in a state where the adhesive is supplied from the discharge port of the dispenser. In this way, the adhesive layer 30 in the form of a thin film is formed on the surface of the insulation coating 12 at the end part of the insulated wire 10 over the entire circumference.

Further, the adhesive applied to the insulation coating 12 preferably contains such a tiny amount of a colorant as not to largely affect adhesiveness and stretchability of the adhesive layer 30. This enables the proper application of the adhesive to the surface of the insulation coating 12 to be inspected by visual confirmation or image processing. The colorant may be a pigment or a dye.

Subsequently, molten aromatic resin is molded into a shape for covering the protection area of the insulated wire 10 by insert molding. The protection area includes the area from the part of the insulated wire 10 where the adhesive layer 30 is formed to the connected part 21 of the metal terminal 21 to the core 11. In insert molding, molten resin is injected and molded in a state where the protection area on the insulated wire 10 and the end part of the metal terminal 20 connected to the insulated wire 10 is arranged as an insert part in a mold. In this way, the waterproof resin portion 40 made of aromatic nylon is formed on the end part of the terminal-provided wire 1 as shown in FIG. 2(c).

The adhesive layer 30 cured before insert molding is temporarily softened by heat of the molten resin during insert molding and adheres to the waterproof resin portion 40 as a molding. In this way, the waterproof resin portion 40 bonded to the insulation coating 12 of the insulated wire 10 by the adhesive layer 30 is formed.

It is important that the adhesive layer 30 is not peeled off from the insulation coating 12 by a pressure receiving from the injected molten resin during insert molding. Specifically, adhesion strength between the insulation coating 12 and the adhesive layer 30 needs to exceed a maximum shear stress received from the molten resin during insert molding. In consideration of this, adhesion strength between the insulation coating 12 and the adhesive layer 30 is preferably 183 kPa or more under an environment of 150° C. (atmosphere temperature) in a test in accordance with the provision of JIS K6850.

Note that the provision of JIS K6850 is the provision of a "test method on tensile shear adhesion strength of adhesive and rigid adherend".

Since the adhesive layer 30 made of modified olefin-based resin and the insulation coating 12 made of polyolefin-based resin are both made of olefin-based resin, they are easily bonded to each other in a molecular level and firmly joined.

Further, modified olefin-based resin as the material of the adhesive layer 30 is modified with a polar group such as anhydrous maleic acid, and aromatic nylon as the material of the waterproof resin portion 40 includes a polar group (amide group). Thus, the adhesive layer 30 and the waterproof resin portion 40 are firmly joined by an attractive force of each polar group.

From the above, the insulation coating 12 made of polyolefin-based resin and the waterproof resin portion 40 made of aromatic nylon are firmly bonded by the adhesive layer 30 made of modified olefin-based resin. In addition, the adhesive layer 30 made of modified olefin-based resin has sufficient stretchability to be able to cope with a difference in thermal expansion coefficient between the insulation coating 12 and the waterproof resin portion 40 and is excellent in water resistance.

Accordingly, the water sealability of the part between the insulation coating 12 and the waterproof resin portion 40 can be increased by adopting the terminal-provided wire 1. Further, the waterproof resin portion 40 made of aromatic nylon is also excellent in oil resistance. Thus, the terminal-provided wire 1 is also suitable for use in a place in an automotive vehicle where the adhesion of oil such as engine oil or brake oil is assumed. In addition, in the case of adopting the terminal-provided wire 1, it is not necessary to increase the number of manufacturing steps and a facility.

Generally, a wiring harness mounted in an automotive vehicle is assumed to be used in a temperature environment in a range from −40° to 150°. Further, a thickness of the insulation coating 12 of the insulated wire 10 is often 0.7 mm or smaller. Further, to maximally reduce the weight of the waterproof resin portion 40 while satisfying a strength condition required for the waterproof resin portion 40, a thickness of the waterproof resin portion 40 is preferably, for example, about 2.0 mm or about 1.0 mm.

Thus, in the terminal-provided wire 1 for automotive vehicle, the adhesive layer 30 preferably has such stretchability as to compensate for a difference in thermal expansion coefficient between the insulation coating 12 and the waterproof resin portion 40 under the above conditions. To that end, the adhesive layer 30 is preferably made of a material which is stretchable by 104.7% or more under the following environment in a test in accordance with the provision of JIS K6251. That environment is an environment of −40° C. (atmosphere temperature), which is a most severe environment temperature in terms of stretchability.

Modified olefin-based resin that is stretched by 104.7% or more at −40° C. is synthetic resin such as functional group imparting SEBS (f-SEBS). Note that the provision of JIS K6251 is a provision on "how to determine tensile characteristic of vulcanized rubber and thermoplastic rubber".

Figures 3, 4:
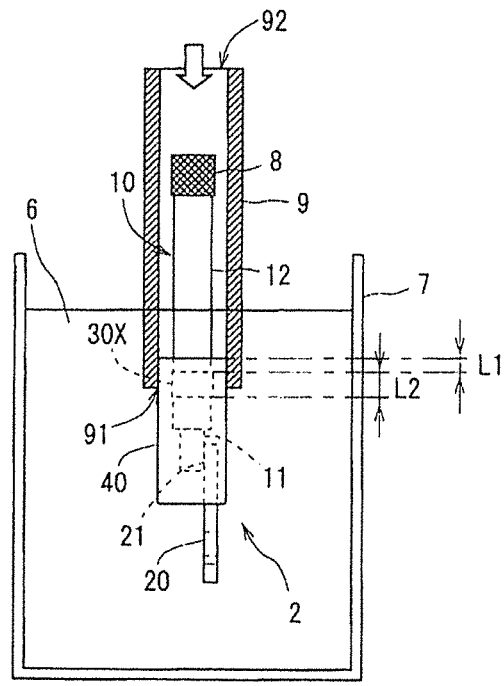
FIG. 3 is a diagram showing a test method for evaluating waterproof performance of the terminal-provided wire.
FIG. 4 is a table showing an evaluation result on waterproof performance of the terminal-provided wire.

An evaluation method and an evaluation result on waterproof performance of the terminal-provided wire 1 are described below with reference to FIGS. 3 and 4. FIG. 3 is a diagram showing a test method for evaluating waterproof performance of the terminal-provided wire 1.

An evaluation test on waterproof performance of the terminal-provided wire 1 is a test which compares the terminal-provided wire 1 and other two types of terminal-provided wires. Those two types of terminal-provided wires differ from the terminal-provided wire 1 only in the material of an adhesive layer. In the following description, three types of terminal-provided wires to be evaluated are collectively referred to as evaluation samples 2. Further, 30X shown in FIG. 3 denotes an adhesive layer of the evaluation sample 2.

Note that the same constituent elements as those shown in FIGS. 1 and 2 are denoted by the same reference signs in FIG. 3.

As shown in FIG. 3, in the evaluation sample 2, an end part of an insulated wire 10 opposite to a side connected to a metal terminal 20 is so sealed by a closing member 8 such as a heat shrinkable tube that air does not enter the inside of an insulation coating 12.

Further, in the evaluation sample 2, a distance L1 from an end of a waterproof resin portion 40 to the adhesive layer 30X is 2 mm. Specifically, the adhesive layer 30X is formed at a position retracted 2 mm from the end of the waterproof resin portion 40. Further, in the evaluation sample 2, a width L2 of the adhesive layer 30X is 2 to 10 mm. Further, a thickness of the adhesive layer 30X is 10 μm to 200 μm.

Further, in the evaluation sample 2, a diameter of a core 11 is 5.3 mm, a thickness of the insulation coating 12 is 0.8 mm and a thickness of a part of the waterproof resin portion 40 covering the insulation coating 12 is 2.0 mm.

Further, in the evaluation test, a part of the evaluation sample 2 from a part of the waterproof resin portion 40 to the end part of the insulated wire 10 on the side sealed by the closing member 8 is held in a state inserted inside a tubular member 9. Further, one opening 91 of the tubular member 9 is sealed by the waterproof resin portion 40.

Further, in the evaluation test, an area of the evaluation sample 2 from the metal terminal 20 on the tip to a part of the insulated wire 10 surrounded by the tubular member 9 is immersed in water 6 contained in a water tank 7. Further, in the evaluation test, compressed air having a pressure of at most 100 kPa is supplied from another opening 92 of the tubular member 9.

In the evaluation test described above, a case where no air bubbles were generated from a clearance between the waterproof resin portion 40 and the metal terminal 20 in the evaluation sample 2 was evaluated to be good (OK) and a case where air bubbles were generated was evaluated to be not good (NG). Further, the evaluation test was conducted under four patterns of test conditions EC1 to EC4 having different environment temperatures (atmosphere temperatures).

A first test condition EC1 was a condition under which the environment temperature was maintained at normal temperature (about 25° C.). A second test condition EC2 was a condition under which the environment temperature was maintained at 150° C. A third test condition EC3 was a condition under which the environment temperature was maintained at −40° C. A fourth test condition EC4 was a condition under which the environment temperature was changed between a first set temperature (−40° C.) and a second set temperature (150° C.). The environment temperature was changed at such a rate as to change from one set temperature to another for about 5 minutes. Further, under the fourth test condition EC4, the environment temperature was kept at each set temperature for about 30 minutes. Note that a similar result is obtained even if the second set temperature is about 120° C.

FIG. 4 is a table showing the evaluation result on waterproof performance of the terminal-provided wire 1. In FIG. 4, S0, S1 and S2 are identification codes of the three types of evaluation samples 2.

The first evaluation sample S0 is the terminal-provided wire 1. Specifically, the adhesive layer 30X of the first evaluation sample S0 is a layer of an adhesive made of modified olefin-based resin. On the other hand, the adhesive layer 30X of the second evaluation sample S1 is a layer of silicon-based adhesive. Further, the adhesive layer 30X of the third evaluation sample S2 is a layer of butyl rubber-based adhesive.

More specifically, the adhesive layer 30X of the first evaluation sample S0 is a layer of an adhesive made of polyolefin silane coupling agent. Further, the adhesive layer 30X of the second evaluation sample S1 is a layer of an adhesive made of silicon sealant. Further, the adhesive layer 30X of the third evaluation sample S2 is a layer of an adhesive made of butyl tape.

Further, in FIG. 4, "OK" indicates that the evaluation sample 2 was good because no air bubbles were generated from the clearance between the waterproof resin portion 40 and the metal terminal 20, whereas "NG" indicates that the evaluation sample 2 was not good because air bubbles were generated.

As shown in FIG. 4, good results were obtained for all the three types of evaluation samples 2 under the second test condition that the environment temperature was maintained at 150°. However, under other environment temperature conditions, a good result was obtained only for the terminal-provided wire 1 including the adhesive layer 30X made of modified olefin-based resin, but a good result could not be obtained for the other evaluation samples 2. By the above evaluation result, excellent water sealability of the terminal-provided wire 1 was proven.

LIST OF REFERENCE SIGNS 1 terminal-provided wire
2 evaluation sample
EC1, EC2, EC3, EC4 identification code of test condition (temperature condition)
S0, S1, S2 identification code of evaluation sample
6 water
7 water tank
8 closing member
9 tubular member
10 insulated wire
11 core
12 insulation coating
20 metal terminal
21 connected part
30, 30X adhesive layer
40 waterproof resin portion
91, 92 opening of tubular member

The invention claimed is:

1. A terminal-provided wire, comprising:
an insulated wire including an end, an electrically conductive core extending to the end and an insulation coating made of a polyolefin-based resin covering the core to a location spaced from the end;
a metal terminal electrically connected to the core at the end of the insulated wire at a connection area;
an adhesive layer made of a modified olefin-based resin, which is an olefin-based resin modified with a polar group, the adhesive layer being bonded on a molecular level to the polyolefin-based resin insulation coating at an end part of the insulated wire over an entire outer circumference of the insulation coating; and
a waterproof resin portion made of aromatic nylon and covering a protection area that includes at least an area from a part of the insulated wire;
the adhesive layer closing a clearance between an outer surface of the insulation coating and an inner surface of the waterproof resin portion, and wherein the adhesive layer is made of a material that is stretchable by 104.7% or more at −40° C. in a test in accordance with the provision of JIS K6251.

2. The terminal-provided wire of claim 1, wherein adhesion strength between the insulation coating and the adhesive layer is 183 kPa or more at 150° C. in a test in accordance with the provision of JIS K6850.

3. The terminal-provided wire of claim 1, wherein the modified olefin-based resin is a styrene-based thermoplastic elastomer.

4. The terminal-provided wire of claim 3, wherein the modified olefin-based resin is a maleic acid modified styrene-butadiene-styrene or styrene-ethylene/butylene-styrene block copolymer.

5. The terminal-provided wire of claim 3, wherein the insulation coating is a cross-linked polyethylene or a cross-linked polypropylene.

6. The terminal-provided wire of claim 3, wherein the waterproof resin portion is bonded to the insulation coating by the adhesive layer.

7. A terminal-provided wire, comprising:
an insulated wire including an end, an electrically conductive core extending to the end and an insulation coating made of a polyolefin-based resin covering the core to a location spaced from the end;
a metal terminal electrically connected to the core at the end of the insulated wire at a connection area;
an adhesive layer made of a modified olefin-based resin, which is an olefin-based resin modified with a polar group, the adhesive layer being bonded on a molecular level to the polyolefin-based resin insulation coating at an end part of the insulated wire over an entire outer circumference of the insulation coating; and
a waterproof resin portion made of aromatic nylon, the waterproof resin portion surrounding and bonding to: the adhesive layer, the insulation coating between the adhesive layer and the core and an area of the insulation coating adjacent to the adhesive layer on a side remote from the core, the waterproof resin portion further surrounding the core exposed at the end of the insulated wire, including the connection area of the terminal to the core;
the adhesive layer closing a clearance between an outer surface of the insulation coating and an inner surface of the waterproof resin portion and being sufficiently stretchable to accommodate differential thermal expansion between the insulation coating and the waterproof resin portion.

8. The terminal-provided wire of claim 7, wherein the adhesive layer is made of a material which is stretchable by 104.7% or more at −40° C. in a test in accordance with the provision of JIS K6251.

9. The terminal-provided wire of claim 8, wherein adhesion strength between the insulation coating and the adhesive layer is 183 kPa or more at 150° C. in a test in accordance with the provision of JIS K6850.

10. The terminal-provided wire of claim 7, wherein adhesion strength between the insulation coating and the adhesive layer is 183 kPa or more at 150° C. in a test in accordance with the provision of JIS K6850.

11. The terminal-provided wire of claim 7, wherein the modified olefin-based resin is a styrene-based thermoplastic elastomer.

12. The terminal-provided wire of claim 11, wherein the modified olefin-based resin is a maleic acid modified styrene-butadiene-styrene or styrene-ethylene/butylene-styrene block copolymer.

13. The terminal-provided wire of claim 11, wherein the insulation coating is a cross-linked polyethylene or a cross-linked polypropylene.

14. The terminal-provided wire of claim 11, wherein the waterproof resin portion is bonded to the insulation coating by the adhesive layer.

15. A terminal-provided wire, comprising:
an insulated wire including an end, an electrically conductive core extending to the end and an insulation coating made of a polyolefin-based resin covering the core to a location spaced from the end;
a metal terminal electrically connected to the core at the end of the insulated wire at a connection area;
an adhesive layer made of a modified olefin-based resin, which is an olefin-based resin modified with a polar group, the adhesive layer being bonded on a molecular level to the polyolefin-based resin insulation coating at an end part of the insulated wire over an entire outer circumference of the insulation coating; and
a waterproof resin portion covering a protection area that includes at least an area from a part of the insulated wire;
the adhesive layer closing a clearance between an outer surface of the insulation coating and an inner surface of the waterproof resin portion and being sufficiently stretchable to accommodate differential thermal expansion between the insulation coating and the waterproof resin portion.

16. The terminal-provided wire of claim 15, wherein adhesion strength between the insulation coating and the adhesive layer is 183 kPa or more at 150° C. in a test in accordance with the provision of JIS K6850.

17. The terminal-provided wire of claim 15, wherein the modified olefin-based resin is a styrene-based thermoplastic elastomer.

18. The terminal-provided wire of claim 17, wherein the modified olefin-based resin is a maleic acid modified styrene-butadiene-styrene or styrene-ethylene/butylene-styrene block copolymer.

19. The terminal-provided wire of claim 17, wherein the insulation coating is a cross-linked polyethylene or a cross-linked polypropylene.

20. The terminal-provided wire of claim 17, wherein the waterproof resin portion is bonded to the insulation coating by the adhesive layer.

* * * * *